N. C. LARSEN.
Measuring Gage.

No. 201,798. Patented March 26, 1878.

Witnesses.
L. W. Kelley
R. N. Dyer.

Inventor.
Niels C. Larsen
by Geo. W. Dyer & Co.
attys.

UNITED STATES PATENT OFFICE.

NIELS C. LARSEN, OF ELGIN, ILLINOIS.

IMPROVEMENT IN MEASURING-GAGES.

Specification forming part of Letters Patent No. 201,798, dated March 26, 1878; application filed December 17, 1877.

*To all whom it may concern:*

Be it known that I, NIELS C. LARSEN, of Elgin, in the county of Kane and State of Illinois, have invented a new and Improved Universal Measuring-Gage, of which the following is a full and exact description.

The nature of my invention relates to an instrument for determining distances and sizes, and my object is to provide a universal index-gage for the accurate measurement of any part of watch-work.

My invention consists in the peculiar construction of the gage having outside caliper-points to one end and removable inside caliper-points to its opposite end, which are so connected by a dovetailed slide that, while taking the measurement of a convex body with the points at one end, its opposite points will be the gage for the exact size of the concave body to fit it; also, of a scale and index-finger for reading the measurement, and a set-screw for holding the gage after being adjusted; also, in the attachment of a sliding foot-rest for measuring and gaging distances.

Figure 1:
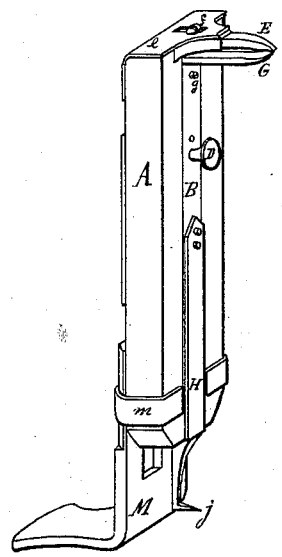
Figure 2:
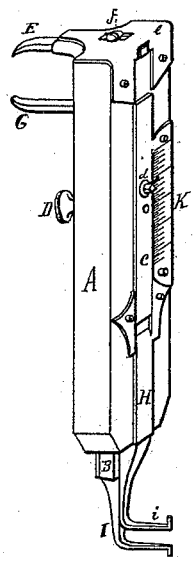
Figure 3:
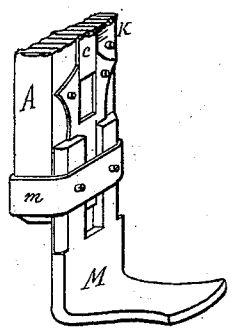
Figure 4:
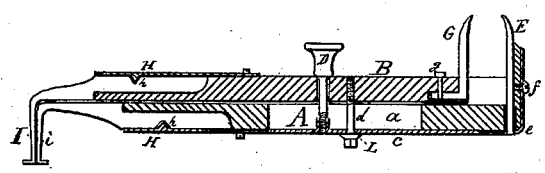
Figure 5:
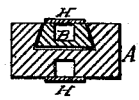
Figure 6:
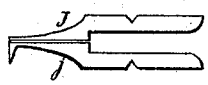

In the drawing, Figure 1 is a perspective view of the gage with the foot-rest attached and in position for measuring distances. Fig. 2 is a similar view of the instrument ready for inside and outside calipering. Fig. 3 is a perspective view of the foot-rest attached. Fig. 4 is a longitudinal section through the center line of the gage. Fig. 5 is a cross-section of the same, and Fig. 6 is an elevation of some detached measuring-points.

A is a rectangular bar, longitudinally grooved out, and dovetailed to receive and hold the bar B, which has a sliding motion therein. The bar A is slotted at $a$, which slot is covered by a plate, $c$, connected with bar B by a screw, $d$, so as to slide therewith.

D is a thumb-screw, the shank of which projects through a hole in bar B, and its screw-threaded point enters the plate $c$, which thus forms the nut for said screw. This thumb-screw is for securing the gage in any given position.

E is one of the jaws for the outside caliper, which is secured to the end of bar A by its rear end being formed a tenon to enter a slot in bar A by a brace-plate, $e$, and screw $f$. G is the other jaw of the outside caliper, which is rigidly secured to the end of bar B by its rear angular end being inserted into a recess and being held by screw $g$.

The opposite or bottom ends of bars A and B are grooved out lengthwise for inserting the inside caliper or measuring points, which grooves are covered each by a flat spring, H, having a nose, $h$, to its inner face. I $i$ are the inside calipering-points, and J $j$ are points for measuring distances, the shanks of which are shaped to enter the grooves in bars A and B, and are notched for the nose $h$ of springs H to enter, and shouldered so that their ends will be flush with the inner faces of their respective bars A or B. The caliper or measuring points I $i$ can be removed by raising the spring H, and thereby dislodging the nose $h$, and can be replaced by another point, J or $j$.

K is an index-plate, which is fixed upon the bar A. The screw $d$ carries a small washer, L, having an index-finger, which moves with the bar B, and indicates the distance between the outside caliper-points. M is the foot-rest attachment, which is an angularly-bent plate, the perpendicular of which is slotted, and is provided with a U-shaped spring, $m$, to grasp the bar A and slide thereon. This foot-rest, in combination with the measuring-point $j$ inserted into the end of bar B, is used for measuring heights or distances of bodies. The base of foot-rest M being placed upon a face-plate, and the outside caliper-points E and G being brought in contact with each other, the bar A is moved up or down in the foot-rest until the distance between the face-plate and point $j$ is adjusted to the distance measured, when the bar B is moved downward until point $j$ touches the face-plate, and is secured in that position by set-screw D, when the distance between points E and G will be the gage for the exact measurement taken.

For measuring diameters, the distance between the points E and G will always indicate the outside diameter of a pin to fit a hole measured by the inside caliper-points I $i$.

As will be seen from the above description, this instrument will apply to the exact measuring and gaging of any part of a watch, or of other small machinery, and will be of great convenience to the mechanic in determining distances and sizes.

What I claim as my invention is—

1. The bars A and B, having points E and G, removable points I and $i$, and set-screw D, all constructed, arranged, and operating substantially as described, for the purpose specified.

2. The bars A and B, having points E and G, set-screw D, and springs H H, each with a nose, $h$, in combination with the points I $i$, all constructed, arranged, and operating substantially as described.

3. The bar A, having point E, removable point I, and index-plate K, in combination with bar B, having point G, removable point $i$, set-screw D, and index-finger L, all constructed, arranged, and operating substantially as herein set forth.

4. The bars A and B, having points E and G, removable point $j$, and set-screw D, in combination with the foot-rest M, having spring $m$, all constructed, arranged, and operating as and for the purpose set forth.

NIELS C. LARSEN.

Witnesses:
OLE OLSEN,
HENRY IVERSON.